US008456515B2

(12) United States Patent
Li et al.

(10) Patent No.: US 8,456,515 B2
(45) Date of Patent: Jun. 4, 2013

(54) STEREO IMAGE AND VIDEO DIRECTIONAL MAPPING OF OFFSET (75) Inventors: Hsiang-Tsun Li, San Diego, CA (US); Behnam Katibian, Irvine, CA (US); Haohong Wang, San Jose, CA (US); Sharath Manjunath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1594 days.

(21) Appl. No.: 11/493,434

(22) Filed: Jul. 25, 2006

(65) Prior Publication Data
US 2008/0024596 A1 Jan. 31, 2008

(51) Int. Cl.
*H04N 13/00* (2006.01)

(52) U.S. Cl.
USPC .......................................................... 348/42

(58) Field of Classification Search
USPC .......................................................... 348/42
See application file for complete search history.

(56) References Cited

U.S. PATENT DOCUMENTS

| 4,734,756 | A |   | 3/1988  | Butterfield et al. |
| 6,043,838 | A | * | 3/2000  | Chen ............................... 348/42 |
| 6,191,809 | B1 | * | 2/2001  | Hori et al. ....................... 348/45 |
| 6,671,399 | B1 |   | 12/2003 | Berestov |
| 6,674,892 | B1 | * | 1/2004  | Melen ........................... 382/154 |
| 6,925,121 | B1 |   | 8/2005  | Komiya et al. |
| 2002/0085089 | A1 | * | 7/2002 | McLaine et al. ................ 348/47 |
| 2002/0196423 | A1 |   | 12/2002 | Shima |
| 2004/0141064 | A1 | * | 7/2004 | Ezawa ...................... 348/207.99 |
| 2006/0055703 | A1 | * | 3/2006 | Jeong et al. .................... 345/560 |
| 2006/0220843 | A1 | * | 10/2006 | Broad et al. ............. 340/539.23 |

FOREIGN PATENT DOCUMENTS

| FR | 2873214   | 1/2006 |
| GB | 2394850   | 5/2004 |
| JP | 64011490  | 1/1989 |
| JP | 10224823  | 8/1998 |
| JP | 11168731 A | 6/1999 |
| WO | 0122740   | 3/2001 |

OTHER PUBLICATIONS

Written Opinion—PCT/US2007/074364, International Search Authority, European Patent Office, Nov. 27, 2007.
International Search Report—PCT/US07/074364—International Search Authority—European Patent Office—Nov. 27, 2007.

* cited by examiner

*Primary Examiner* — Richard Torrente
(74) *Attorney, Agent, or Firm* — James R. Gambale, Jr.

(57) ABSTRACT

A method and apparatus for generating stereoscopic images of a scene is described. The apparatus may have a first image sensor, a second image sensor spaced apart from the first image sensor, a diversity combine module to combine image data from the first and second image sensors, and an image processing module configured to process combined image data from the diversity combine module may be used to generate stereoscopic images of a scene.

38 Claims, 10 Drawing Sheets

STEREO IMAGE AND VIDEO DIRECTIONAL MAPPING OF OFFSET

RELATED APPLICATIONS

The present application is related to co-assigned U.S. patent application Ser. No. 11/493,439, filed on Jul. 25, 2006, entitled "MOBILE DEVICE WITH DUAL DIGITAL CAMERA SENSORS AND METHODS OF USING THE SAME," which is hereby incorporated by reference in its entirety.

TECHNICAL FIELD

The present application relates to electronic devices, and more particularly, to a stereo image and video capturing device with dual digital sensors and methods of using the same.

BACKGROUND

Some mobile devices, such as cellular phones, may have sensors to capture images.

SUMMARY

One aspect relates to an apparatus comprising a first image sensor, a second image sensor spaced apart from the first image sensor, a diversity combine module to combine image data from the first and second image sensors, and an image processing module configured to process combined image data from the diversity combine module.

Another aspect relates to a method comprising: sensing a first image using a first image sensor; sensing a second image using a second image sensor spaced apart from the first image sensor; diversity combining image data from the first and second image sensors; and processing the combined image data to generate an anaglyph image.

The details of one or more embodiments are set forth in the accompanying drawings and the description below.

DETAILED DESCRIPTION

Perspective Projection

Figure 2A:
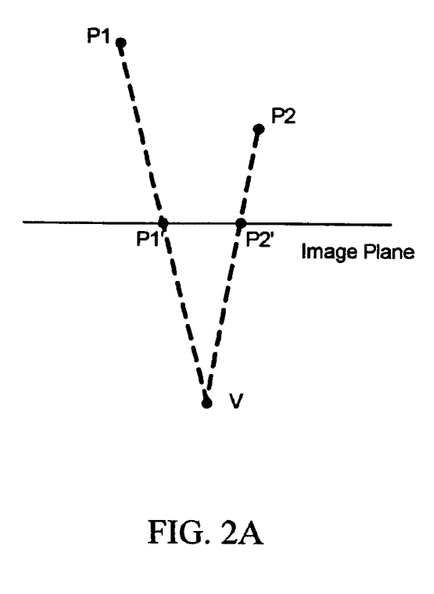
FIG. 2A illustrates two object points P1 and P2 projected to an image plane P1' and P2', where single viewpoint V is the location of a camera sensor.

A camera captures an image by performing perspective projection, as shown in FIG. 2A. FIG. 2A illustrates two object points P1 and P2 projected to an image plane P1' and P2', where single viewpoint V is the location of a camera sensor.

Figure 2B:
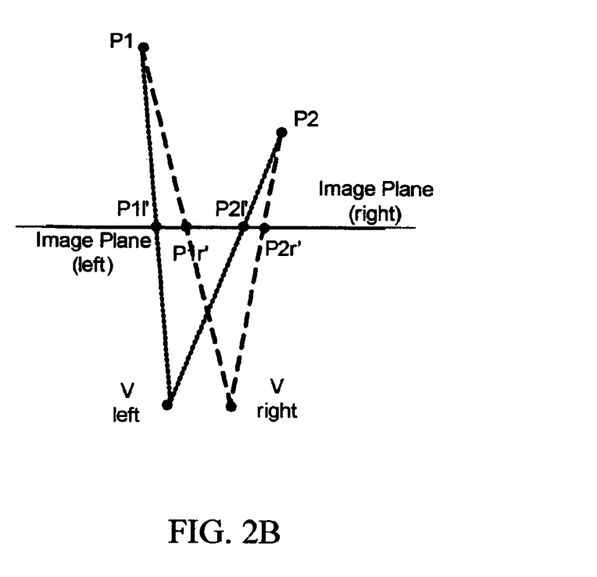
FIG. 2B illustrates perspective projection of two object points P1 and P2 projected to a right image plane P1$r'$ and P2$r'$ and a left image plane P1$l'$ and P2$l'$, where V left and V right are locations of two camera sensors.

In order to simulate a human vision system, which has depth perception, a device with two camera sensors may capture left eye and right eye views, as shown in FIG. 2B. FIG. 2B illustrates perspective projection of two object points P1 and P2 projected to a right image plane P1$r'$ and P2$r'$ and a left image plane P1$l'$ and P2$l'$, where V left and V right are locations of two camera sensors. The projection difference of the objects on the image planes generates depth perception as a stereo image.

Figure 7A:
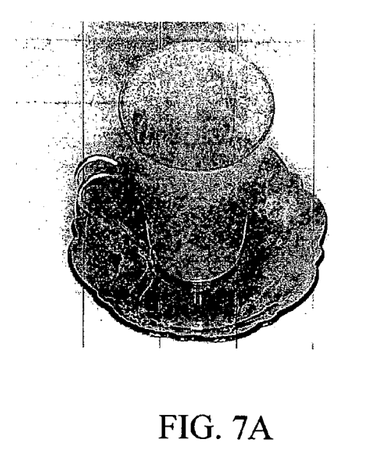
FIGS. 7A-7B and 8A-8B illustrate examples of images captured from two sensors separated by a horizontal distance.
Figure 7B:
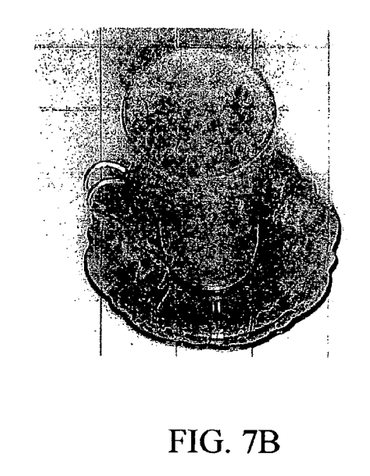
Figure 7C:
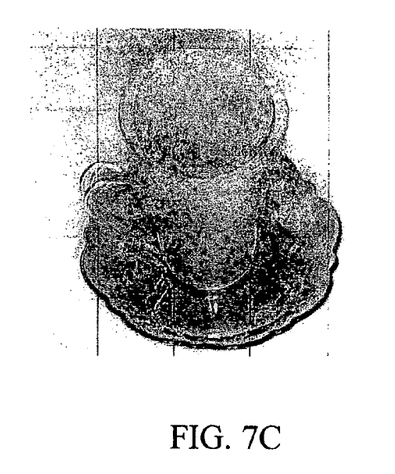
FIGS. 7C and 8C show 3-D images composed from the left eye and right eye views of FIGS. 7A-7B and 8A-8B.
Figure 8A:
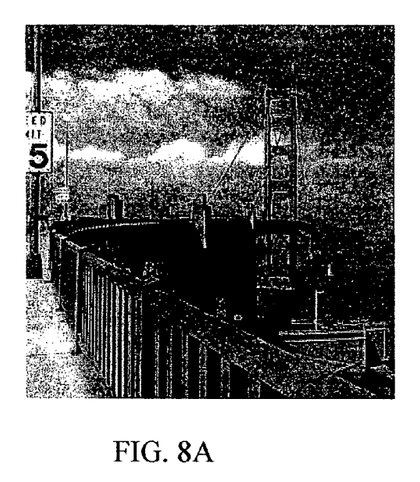
Figure 8B:
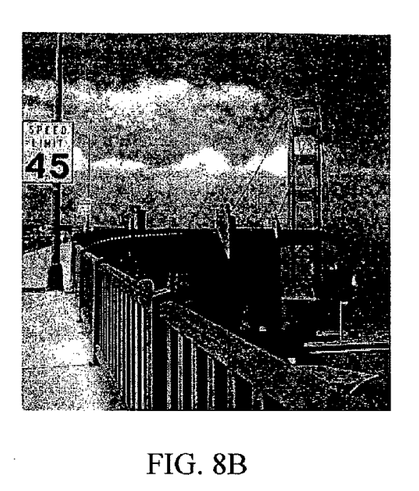
Figure 8C:
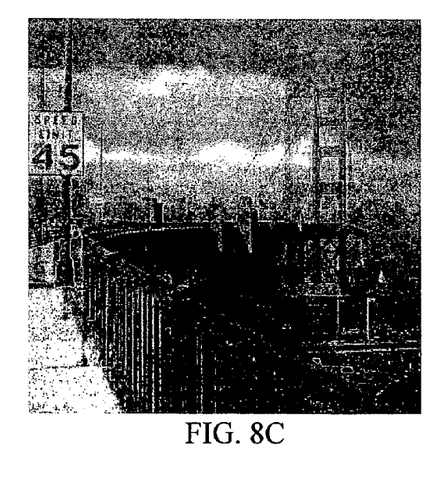

FIGS. 7A-7B and 8A-8B illustrate examples of images captured from two sensors separated by a horizontal distance of around 6 cm. FIGS. 7C and 8C show 3-D images composed from the left eye and right eye views of FIGS. 7A-7B and 8A-8B, as described below.

3-D Stereo Image and Video

Enhancing perceptual realism has become a factor driving next generation multimedia development. Fast growing multimedia communications and entertainment markets can use 3-dimensional (3-D) (also called stereo or stereoscopic) image and video technologies that cover stereo image capturing, processing, compression, delivery, and display.

A major difference between a stereo image and a mono image is that the former provides the feel of a third dimension and a distance to objects in a scene. Human vision by nature is stereoscopic due to binocular views seen by our left and right eyes in different perspective viewpoints. Our brains can synthesize an image with stereoscopic depth.

Multimedia devices may be implemented with a monoscopic infrastructure. A monoscopic camera may capture and generate stereo images. A monoscopic camera may use statistics from auto-focus processing to detect and estimate depth information for generating stereo images.

Device with Dual Sensors

There may be a number of issues related to a device with dual sensors, such as computational complexity of increased data processing, power consumption, location, and resolution settings for these sensors. A device, such as a camera phone, may have two image sensors at fixed locations, i.e., the two sensors cannot be moved. The two sensors may be configured or treated differently, such as a primary sensor and a secondary sensor with different resolutions. A low resolution sensor may be used to capture videos, while a high resolution sensor may be used to capture still images. Images taken from the two sensors may be combined or processed together, as described below.

A dual sensor camera phone may obtain accurate views for capturing and producing a stereoscopic image or video. The cost of a dual camera sensor mobile device may be reduced to be about the same as a one-sensor device. The description below describes a dual camera sensor mobile device or stereoscopic imaging system that may enable high-quality stereo image/video capturing and stereo image composition.

Figure 1:
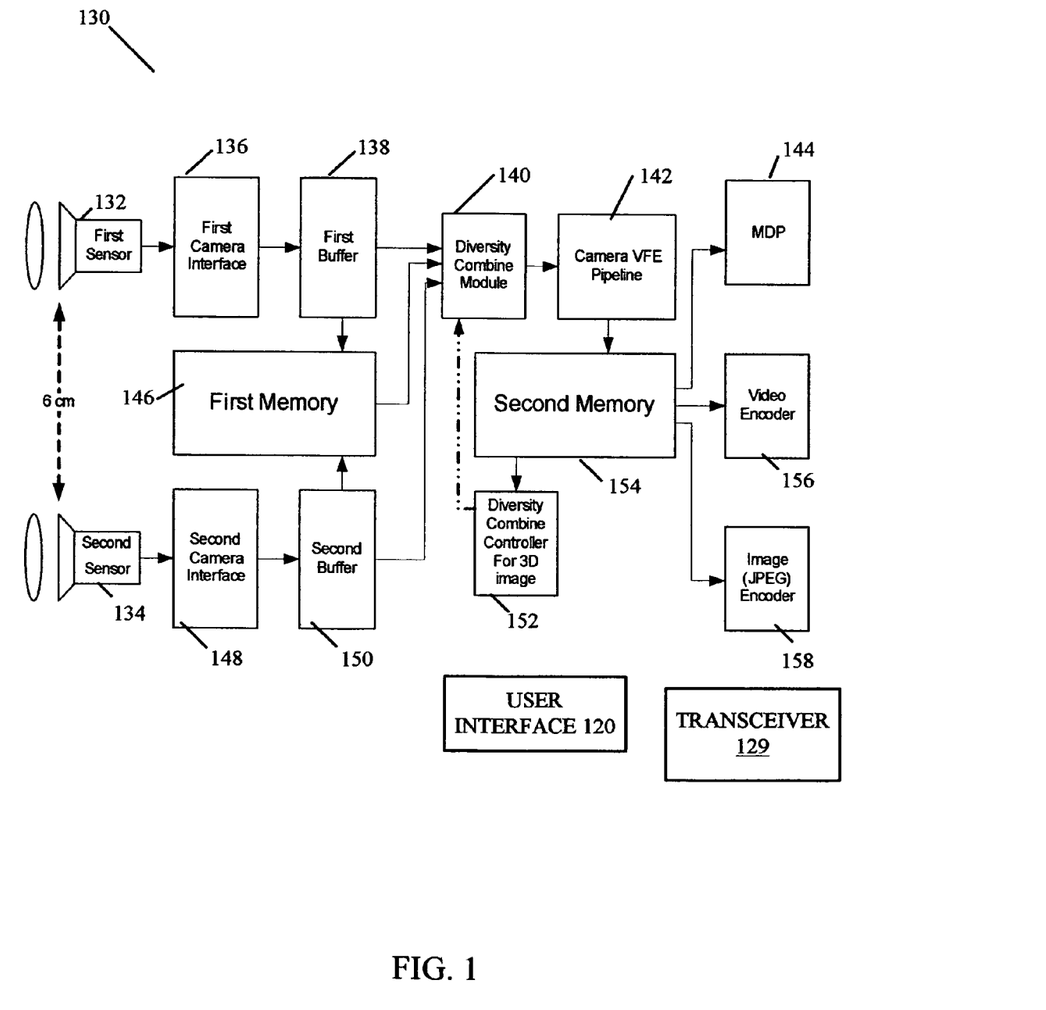
FIG. 1 illustrates a mobile device with two or more camera sensors.

FIG. 1 illustrates a mobile device 130 with dual digital camera sensors 132, 134 configured to capture and process 3-D stereo images and videos. In general, the mobile device 130 may be configured to capture, create, process, modify, scale, encode, decode, transmit, store, and display digital images and/or video sequences. The device 130 may provide high-quality stereo image capturing, various sensor locations, view angle mismatch compensation, and an efficient solution to process and combine a stereo image.

The mobile device 130 may represent or be implemented in a wireless communication device, a personal digital assistant (PDA), a handheld device, a laptop computer, a desktop computer, a digital camera, a digital recording device, a network-enabled digital television, a mobile phone, a cellular phone, a satellite telephone, a camera phone, a terrestrial-based radiotelephone, a direct two-way communication device (sometimes referred to as a "walkie-talkie"), a camcorder, etc.

The mobile device 130 may include a first sensor 132, a second sensor 134, a first camera interface 136, a second camera interface 148, a first buffer 138, a second buffer 150, a memory 146, a diversity combine module 140 (or engine), a camera process pipeline 142, a second memory 154, a diversity combine controller for 3-D image 152, a mobile display processor (MDP) 144, a video encoder 156, a still image encoder 158, a user interface 120, and a transceiver 129. In addition to or instead of the components shown in FIG. 1, the mobile device 130 may include other components. The architecture in FIG. 1 is merely an example. The features and techniques described herein may be implemented with a variety of other architectures.

The sensors 132, 134 may be digital camera sensors. The sensors 132, 134 may have similar or different physical structures. The sensors 132, 134 may have similar or different configured settings. The sensors 132, 134 may capture still image snapshots and/or video sequences. Each sensor may include color filter arrays (CFAs) arranged on a surface of individual sensors or sensor elements.

The memories 146, 154 may be separate or integrated. The memories 146, 154 may store images or video sequences before and after processing. The memories 146, 154 may include volatile storage and/or non-volatile storage. The memories 146, 154 may comprise any type of data storage means, such as dynamic random access memory (DRAM), FLASH memory, NOR or NAND gate memory, or any other data storage technology.

Figure 3:
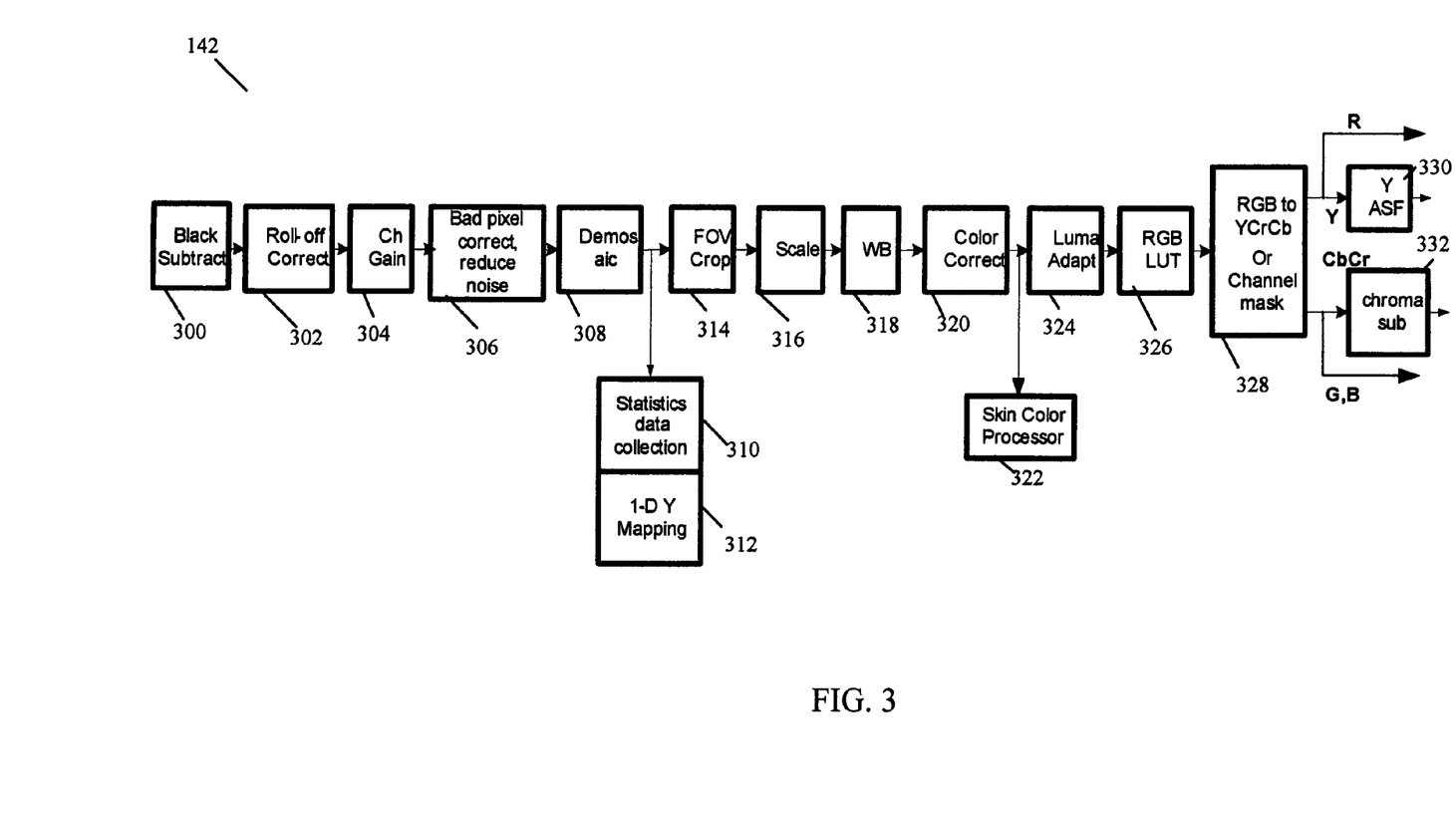
FIG. 3 illustrates an example of a camera process pipeline in the device of FIG. 1.

The camera process pipeline 142 (also called engine, module, processing unit, video front end (VFE), etc.) may comprise a chip set for a mobile phone, which may include hardware, software, firmware, and/or one or more microprocessors, digital signal processors (DSPs), application specific integrated circuits (ASICs), field programmable gate arrays (FPGAs), or various combinations thereof. The pipeline 142 may perform one or more image processing techniques to improve quality of an image and/or video sequence. FIG. 3 illustrates an example of the camera process pipeline 142 of FIG. 1, as described below.

The video encoder 156 may comprise an encoder/decoder (CODEC) for encoding (or compressing) and decoding (or decompressing) digital video data. The video encoder 156 may use one or more encoding/decoding standards or formats, such as MPEG or H.264.

The still image encoder 158 may comprise an encoder/decoder (CODEC) for encoding (or compressing) and decoding (or decompressing) image data. The still image encoder 156 may use one or more encoding/decoding standards or formats, such as JPEG.

The transceiver 129 may receive and/or transmit coded images or video sequences to another device or a network. The transceiver 129 may use a wireless communication standard, such as code division multiple access (CDMA). Examples of CDMA standards include CDMA 1x Evolution Data Optimized (EV-DO) (3GPP2), Wideband CDMA (WCDMA) (3GPP), etc.

The device 130 may include a highly optimized hardware solution for a two-sensor camera architecture, whose cost may be approximately equivalent to a process engine used in single sensor camera. A set of modules may be implemented in the dual camera sensor device 130 to provide high visual quality of captured images and videos and a low-power constraint.

The device 130 may maintain a fixed horizontal distance between the two sensors 138, 150 such that 3-D stereo image and video can be generated efficiently. As shown in FIG. 1, the two sensors 132, 134 may be separated by a horizontal distance of about 6 cm, but other distances more or less than 6 cm may be used. The first sensor 132 may be a primary sensor, and the second sensor 134 may be a secondary sensor. The second sensor 134 may be shut off for non-stereo mode to reduce power consumption.

The two buffers 138, 150 may store real time sensor input data, such as one row or line of pixel data from the two sensors 132, 134. Sensor pixel data may enter the small buffers 138, 150 on line (i.e., in real time) and be processed by the diversity combine module 140 and/or camera engine pipeline engine 142 offline with switching between the sensors 132, 134 (or buffers 138, 150) back and forth. The diversity combine module 140 and/or camera engine pipeline engine 142 may operate at about two times the speed of one sensor's data rate. To reduce output data bandwidth and memory requirement, stereo image and video may be composed in the camera engine 142.

The diversity combine module 140 may first select data from the first buffer 138. At the end of one row of buffer 138, the diversity combine module 140 may switch to the second buffer 150 to obtain data from the second sensor 134. The diversity combine module 140 may switch back to the first buffer 138 at the end of one row of data from the second buffer 150.

In order to reduce processing power and data traffic bandwidth, the sensor image data in video mode may be sent directly through the buffers 138, 150 (bypassing the first memory 146) to the diversity combine module 140. On the other hand, for a snapshot (image) processing mode, the sensor data may be saved in the memory 146 for offline processing. In addition, for low power consumption profiles, the second sensor 134 may be turned off, and the camera pipeline driven clock may be reduced.

Stereo Image Composition

FIGS. 7A-7B and 8A-8B illustrate examples of images captured from first and second sensors 132, 134 (left eye and right eye views) separated by a horizontal distance of around 6 cm. FIGS. 7A-7B and 8A-8B show images that can be directly passed to an autostereoscopic system for display (in device 130 of FIG. 1 or some other device receiving data from device 130). 3-D glasses should be used by a user to view the stereoscopic display, which demonstrates effects of the stereoscopic application. The difference between autostereoscopic and stereoscopic that a stereoscopic display requires 3-D glasses. The 3-D glasses selectively admit a correct view for each eye. For color filters (Anaglyph) on these 3-D glasses, the left eye view only contains red channel data, and the right eye view may contain green and blue channels. A color channel mask 328 in the camera process pipeline of FIG. 3 may remove unused channel data.

FIGS. 7C and 8C illustrate 3-D stereo images (anaglyph) composed from the two-eye views in FIGS. 7A-7B and 8A-8B.

Camera Pipeline

FIG. 3 illustrates an example of the camera process pipeline 142 in FIG. 1. For example, the pipeline 142 may include a black subtract module 300, a lens roll-off correction module 302, a channel gain module 304, a bad pixel correction or noise reduction module 306, a demosaic module 308, a statistics data collection module 310, a 1-D Y mapping module 312, a field of view (FOV) cropping module 314, a scaling module 316, a white balance module 318, a color correction module 320, a skin color processor 322, a luma adaptation module 324, a red/green/blue (RGB) look up table (LUT), a RGB to YCrCb color conversion or channel mask module 328, a Y adaptive spatial filtering (ASF) module 330, and a chroma sub module 332. In addition to or instead of the modules/functions shown in FIG. 3, the pipeline 142 may include other modules and/or functions. The outputs of the pipeline 142 may be provided to the second memory 154 in FIG. 1.

Vertical Mismatch Offset

The device 130 may reliably calculate and compensate vertical mismatch of two view images captured from the two independent sensors 132, 134.

Figure 5:
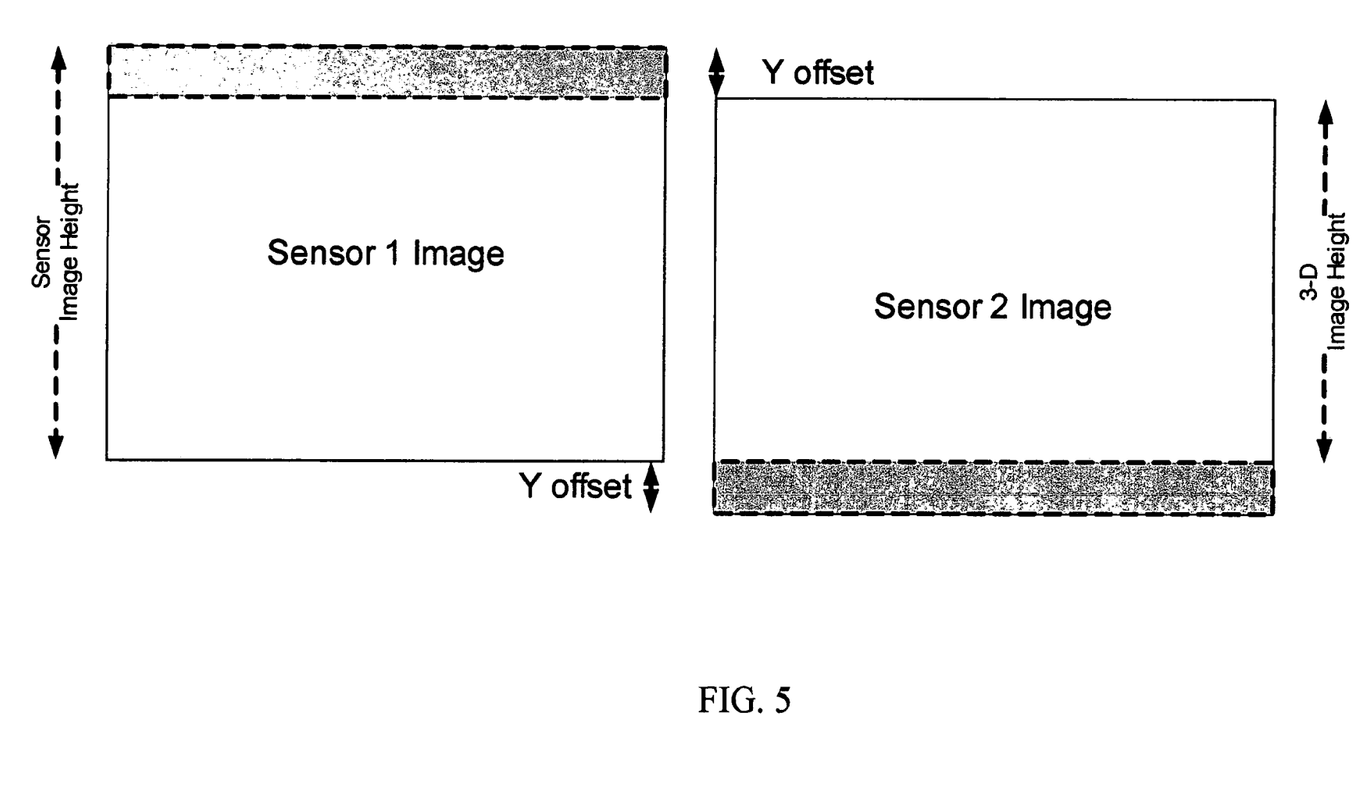
FIG. 5 illustrates examples of images viewed by two sensors of the device of FIG. 1.

FIG. 5 illustrates examples of images viewed or captured by the two sensors 132, 134 of FIG. 1. A valid row index for each sensor 132, 134 may be derived from a vertical mismatch offset, called "Y offset," existing between the two sensors 132, 134. The diversity combine controller for 3-D image 152 may derive Y offset, as described below with FIG. 6. For example, if Y offset=5, a valid row index for the first sensor 132 may be from 5 to (image height−1), and from 0 to (image height−6) for the second sensor 134. Alternatively, if Y offset=−5, the valid row index for the first sensor 132 may be from 0 to (image height−6), and from 5 to (image height−1) for the second sensor 134. The single camera VFE pipeline 142 may be driven by a higher clock frequency to consume the two sensors' output data. In order to estimate the Y offset, the Y 1-D mapping module 312 provides vertical direction 1-D mapping data, e.g., Y SumSensor1[ ] and Y SumSensor2[ ] in the pseudo code of Appendix A. Since the input row data comes alternately from the first sensor 132 and the second sensor 134, Y SumSensor1[ ] and Y SumSensor2[ ] for each row will be available at the end of a frame. When the Y estimation task is disabled, this 1-D Y mapping module 312 may be disabled to reduce power consumption.

The channel mask module 328 performs color conversion for regular image and video processing and may perform a color channel mask task in composing 3-D images. Since the left eye view only includes the red channel data, and the right eye view includes green and blue channels, the camera engine 142 may only send out the red channel data for the first sensor row data, and green and blue channel data for the second sensor row data. Therefore, the output data traffic bandwidth, memory requirement, and post processing task for composing stereo image may be reduced.

Video Mode Processing

Figure 4:
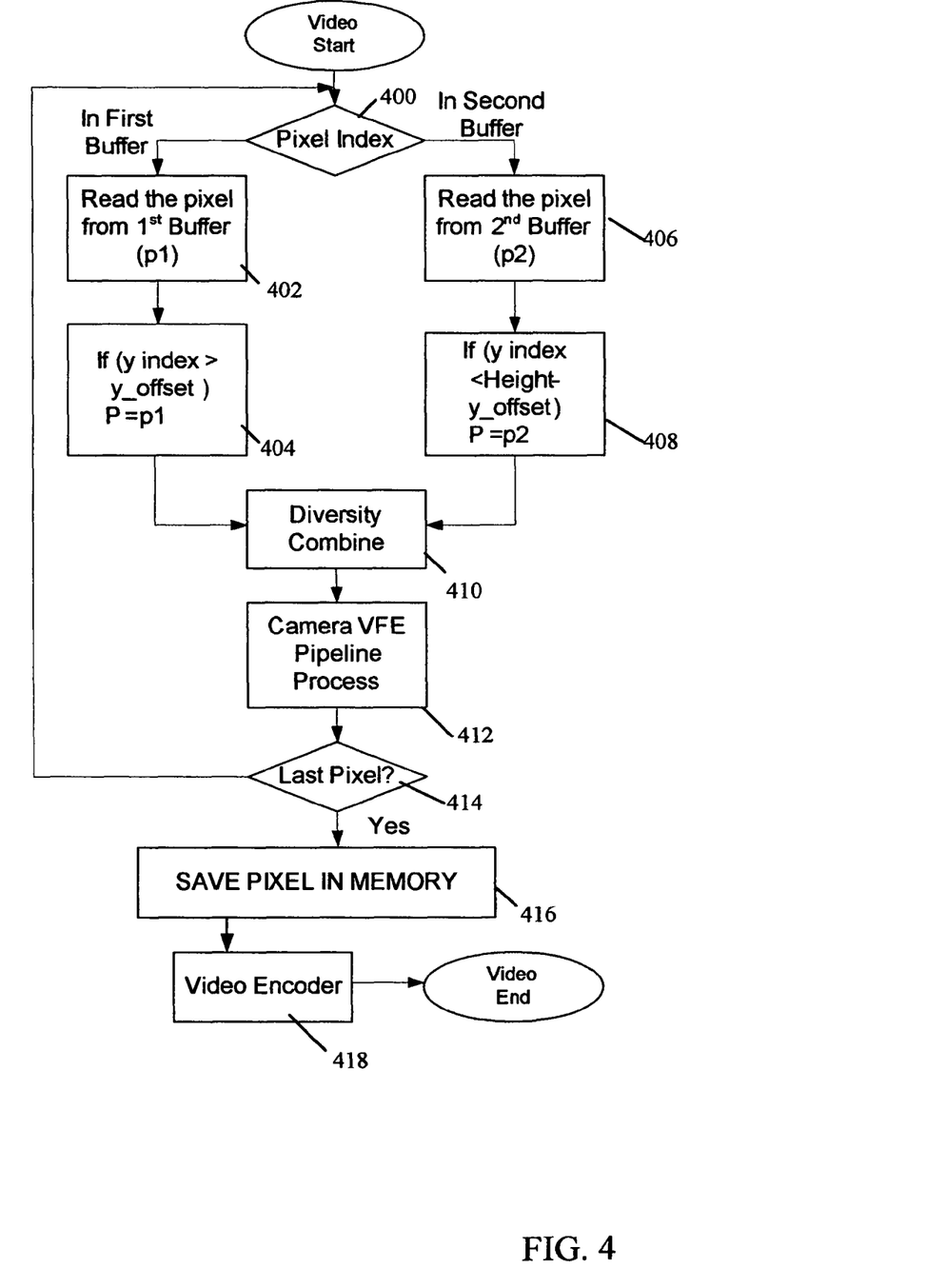
FIG. 4 illustrates a stereo video process flow chart, which may be performed by the device of FIG. 1.

FIG. 4 illustrates a stereo video process flow chart, which may be performed by the device 130 of FIG. 1. A stereo image process may be implemented in a similar way as the stereo video mode process of FIG. 4. In block 400, a horizontal pixel index determines whether the buffer selection is the first buffer 138 (first sensor data) or the second buffer 150 (second sensor data). In blocks 402, 406, a pixel is read from the first or second buffers 138, 150, respectively. In blocks 404 and 408, a vertical pixel index (y pixel) is compared with Y offset (y_offset) for valid data criterion, which is different from the first and second sensor data. The valid row data will be sent to the diversity combine module 140 in block 410 and then to the camera pipeline engine 142 in block 412. Block 414 determines whether the pixel was the last pixel, and if not, returns to block 400. If that was the last pixel, the processed red channel data of the first sensor data and green and blue channel data of the second sensor data will be saved in the memory 154 (block 416) for further usage, such as displaying or video encoding in block 418.

Sensor Controller

Due to location inaccuracy and view angle mismatch, there may be some vertical mismatch offset between the two sensors' captured images. FIG. 5 illustrates vertical offset ("Y offset") between the two sensors' captured images. The two sensors' controller 152 may adjust the composed image located in a common overlapped area in the vertical direction. After cropping out the top portion or bottom portion of the image (by blocks 404 and 408 in FIG. 4 or FOV cropping module 314 in FIG. 3), the "composed image height" is equal to the "sensor image height" minus Y offset, as shown in FIG. 5.

Figure 6:
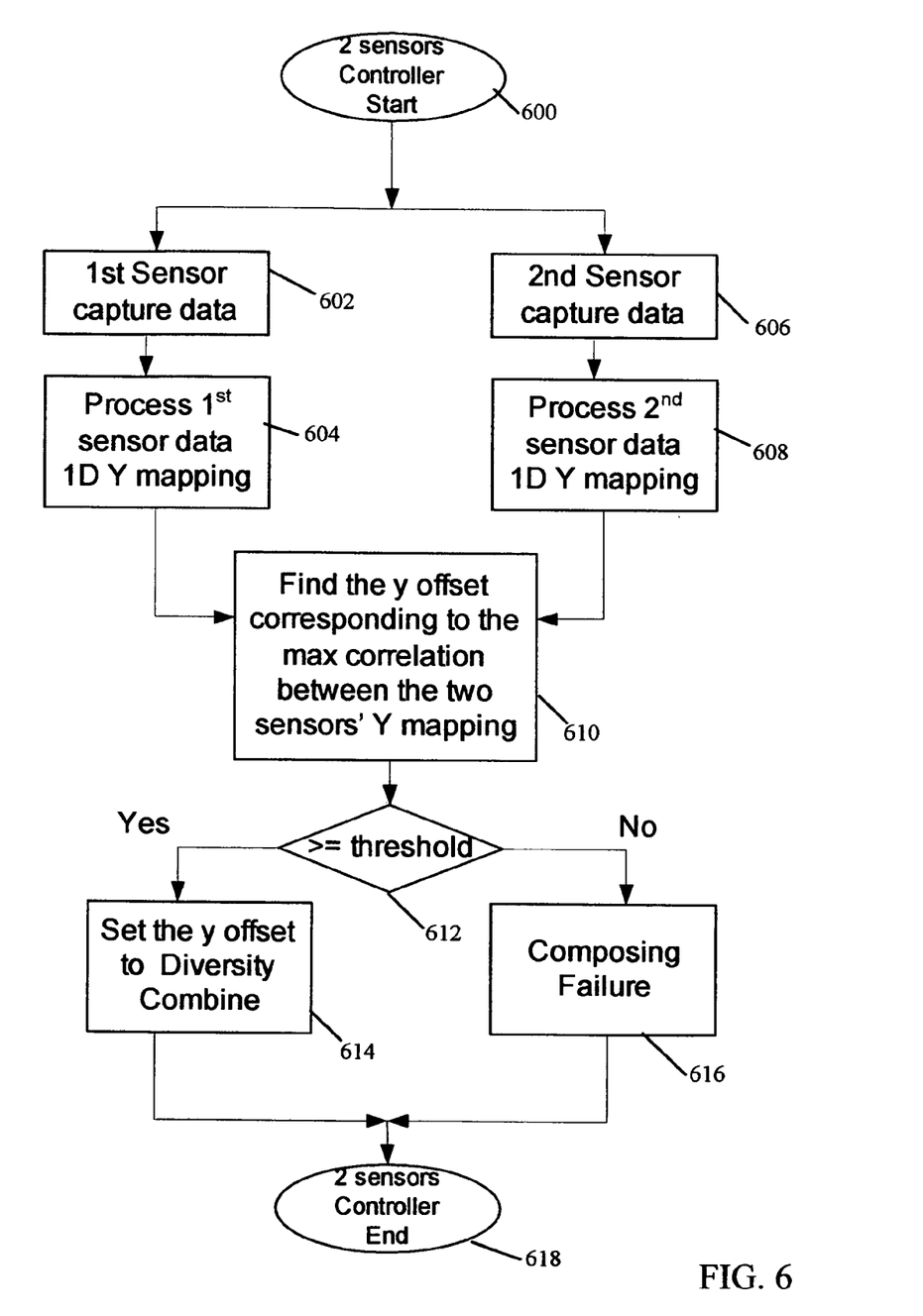
FIG. 6 illustrates a flow chart of a two sensor controller of the device of FIG. 1.

FIG. 6 illustrates a flow chart of the two sensor controller 152 in FIG. 1. FIG. 6 illustrates an estimation task that may be active when the device 130 is powered on or when a sensor position changes. Since the offset is in the vertical direction only, the proposed estimation solution is done by 1-D Y mapping (by 1-D Y mapping module 312 in FIG. 3) and followed by 1-D cross-correlation. Appendix A lists the corresponding pseudo code.

Since two images are captured simultaneously, with a horizontal distance and a small vertical distance, the two scenes may be very similar and highly correlated in the horizontal direction. Therefore, the process may use only 1-D vertical mapping and a cross correlation search to achieve robust and efficient target.

In blocks 602 and 606, the first and second sensors 132, 134 capture data. Accumulated luma data for each row is available at the end of a frame. In blocks 604 and 608, the camera pipeline 142 processes sensor data with 1-D Y mapping by 1-D Y mapping module 312 in FIG. 3.

In block 610, the controller 152 in FIG. 1 finds a Y offset corresponding to maximum correlation between the two sensors' Y mapping. Cross correlation of two sensors' Y mapping data is done in post processing by controller 152 in FIG. 1. The offset corresponding to a maximum cross correlation is the derived Y offset. The vertical offset may be a limited value depending on the view angle. The search range may also be limited.

In block 612, in order to avoid stereo image processing failure, the maximum cross correlation is compared with a threshold by controller 152 in FIG. 1. If the maximum cross correlation is less than a threshold, the stereo image is composed successfully, and the y offset is set for diversity combine in block 614. For example, the threshold could be set as 90% of auto correlation of the first sensor Y mapping data. In other words, the composed status is successful only when the overlapped image energy between the first sensor and second sensor data is larger or equal to the 90% of the energy of the first sensor data. If the maximum cross correlation is less than the threshold, the stereo image was not composed successfully, as shown in block 616.

In summary, the device 130 with dual camera sensors 132, 134 may enable high-quality stereo image and video capturing. A number of issues such as sensor location, view angle mismatch compensation, and two-view combination may be addressed. The device 130 may be highly optimization to meet a low-power constraint of specific applications, such that the cost of the device 130 is approximately equivalent to the process engine used in single sensor camera phone. On the other hand, a flexible and reliable solution may calculate and compensate the vertical mismatch of two view images captured from two independent sensors 132, 134 to guarantee high visual quality.

Device with Two Sensors, where at Least One Sensor is Movable

Figure 9:
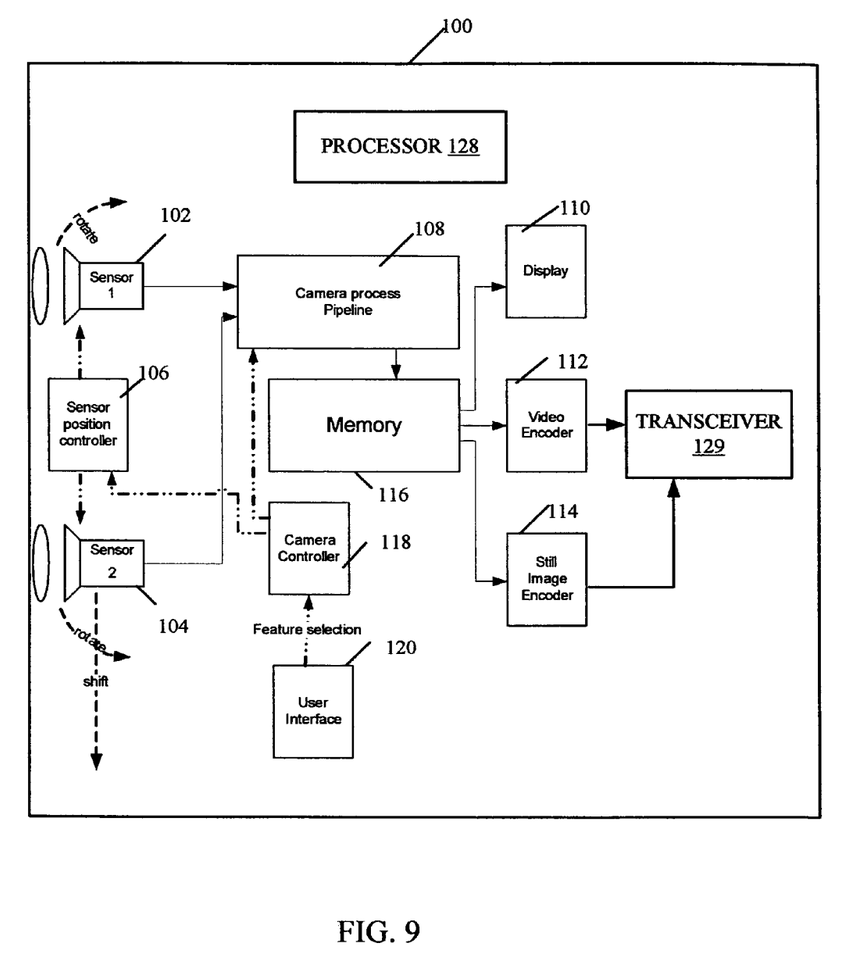
FIG. 9 illustrates another configuration of a mobile device with two or more sensors.

FIG. 9 illustrates another configuration of a mobile device 100 with two or more sensors 102, 104. The device 100 may be configured to implement one or more of the functions described above. The mobile device 100 may be configured to capture, create, process, modify, scale, encode, decode, transmit, store, and display digital images and/or video sequences. The mobile device 100 may represent or be implemented in a device, such as a wireless communication device, a personal digital assistant (PDA), a laptop computer, a desktop computer, a digital camera, a digital recording device, a network-enabled digital television, a mobile phone, a cellular phone, a satellite telephone, a camera phone, a terrestrial-based radiotelephone, a direct two-way communication device (sometimes referred to as a "walkie-talkie"), etc.

The mobile device 100 may include a first sensor 102, a second sensor 104, a sensor position controller 106, a camera process pipeline 108, a display 110, a video encoder 112, a still image encoder 114, a memory 116, a camera controller 118, a user interface 120, a processor 128 and a transceiver 129. In addition to or instead of the components shown in FIG. 9, the mobile device 100 may include other components. The architecture illustrated in FIG. 9 is merely an example. The features and techniques described herein may be implemented with a variety of other architectures.

The sensors 102, 104 may be digital camera sensors. The sensors 102, 104 may capture still image snapshots and/or video sequences. Each sensor may include color filter arrays (CFAs) arranged on a surface of individual sensors or sensor elements.

The memory 116 may store images or video sequences before and after processing. The memory 116 may include volatile storage and non-volatile storage. The memory 116 may comprise any type of data storage means, such as dynamic random access memory (DRAM), FLASH memory, NOR or NAND gate memory, or any other data storage technology.

The camera process pipeline 108 (also called an engine, module, processing unit, etc.) may comprise a chip set for a mobile phone, which may include hardware, software, firmware, and/or one or more microprocessors, digital signal processors (DSPs), application specific integrated circuits (ASICs), field programmable gate arrays (FPGAs), or various combinations thereof. The camera process pipeline 108 may perform one or more image processing techniques to improve quality of an image and/or a video sequence. For example, the pipeline 108 may perform techniques such as demosaicing, lens rolloff correction, scaling, color correction, color conversion, and spatial filtering. The pipeline 108 may also perform other techniques.

The video encoder 112 may comprise an encoder/decoder (CODEC) for encoding (or compressing) and decoding (or decompressing) digital video data.

The still image encoder 114 may comprise an encoder/decoder (CODEC) for encoding (or compressing) and decoding (or decompressing) image data.

The transceiver 129 may receive and/or transmit coded images or video sequences to another device or a network. The transceiver 129 may use a wireless communication standard such as code division multiple access (CDMA). Examples of CDMA standards include CDMA 1x Evolution Data Optimized (EV-DO), Wideband CDMA (WCDMA), etc.

More Details on Sensors

Designs and features of the mobile device 100 with two separate sensors 102, 104 are described below. The sensors 102, 104 may have two aspects. First, the sensor position controller 106 may adjust locations and/or positions of the two sensors 102, 104, such as rotating, shifting or sliding the sensors 102, 104 in one or more directions. Some examples of movement are shown in FIG. 9, but other 2-dimensional (2-D) or 3-dimensional (3-D) movements may be implemented. The movements may be set by a user and/or by the camera controller 118. Adjustable sensors 102, 104 may enable a number of advanced features, such as image quality improvement, 3-D image and video visualization, and 360-degree panoramic video generation.

The movements may be fixed for a period of time or alternate with a frequency. In one configuration, the device 100 comprises more than two sensors, where the sensors are arranged in line, a triangle, a circle or some other pattern. In this configuration, the device 100 may activate certain sensors and deactivate other sensors without moving any sensor. This configuration may avoid issues that arise from moving sensors.

Second, various settings of the sensors 102, 104, such as resolution, may be adjustable to enable more advanced features and/or image processing applications. The dual sensors 102, 104 may improve image processing flexibility of the mobile device 100.

Figure 10:
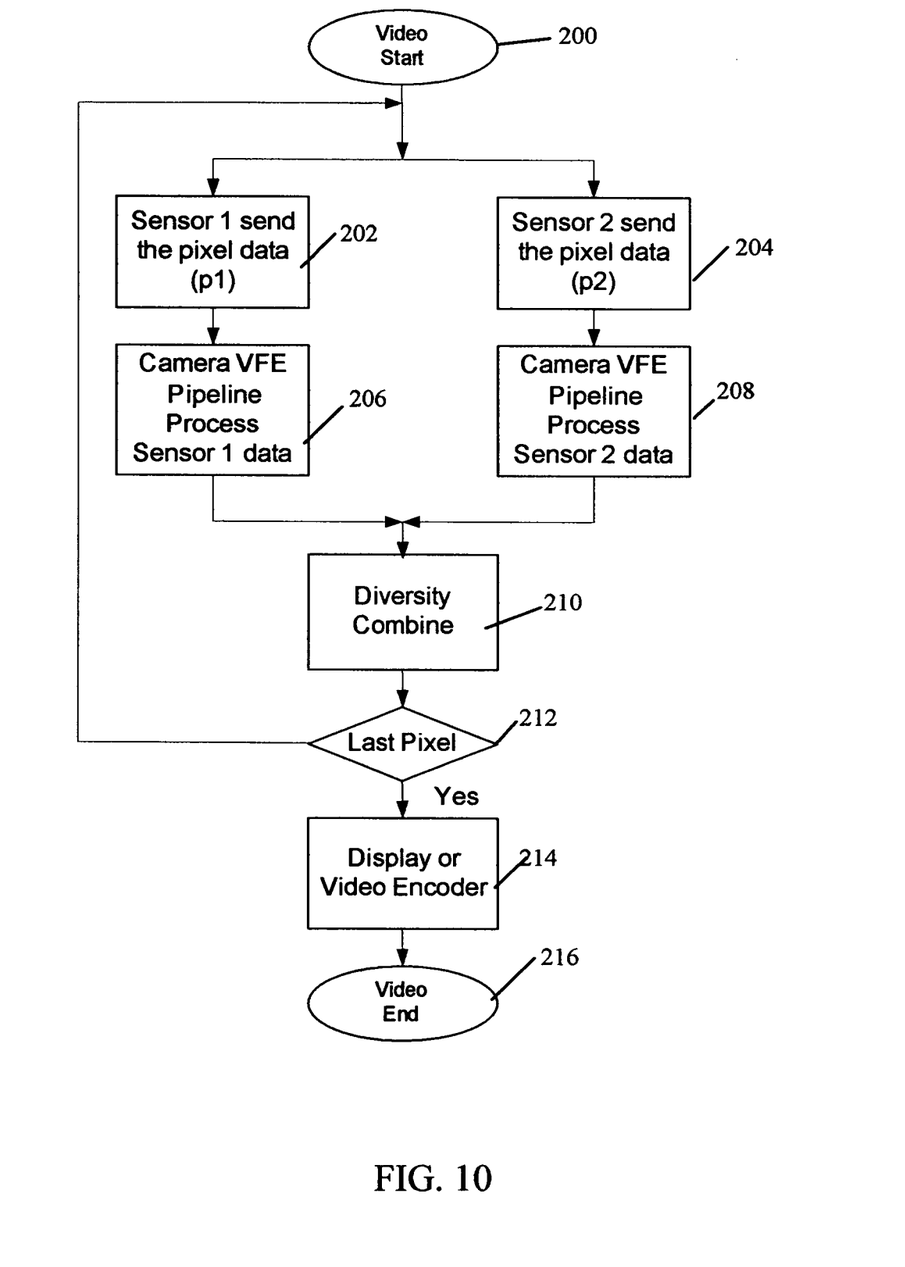
FIG. 10 illustrates a method of video mode processing using the device of FIG. 9.

FIG. 10 illustrates a method of video mode processing using the device 100 of FIG. 9. FIG. 10 may be combined or modified to include any of the functions described with reference to FIGS. 1-8C. In blocks 202 and 204, the sensors 102, 104 capture images and send pixel data to the camera process pipeline 108, which may be implemented in or combined with a video front end (VFE). In blocks 206 and 208, the camera process pipeline 108 processes the pixel data. For example, the camera process pipeline 108 may improve image quality by adjusting color, scaling size, and enhancing image contrast.

In block 210, the camera process pipeline 108 may combine (or stitch) the processed, captured images from the two sensors 102, 104. The combined image may be saved in the memory 116 for display by the display 110 and/or still image and/or video encoding by the encoders 112, 114 (block 214). A decision block 212 determines whether there is more pixel data to capture and process.

The two sensors 102, 104 may provide one or more advantages. First, an observer's viewing angles may be controllable by adjusting the sensor positions. Second, the input images from two sensors 102, 104 may be jointly processed and composed. Third, a horizontal distance between the two sensors 102, 104 may be adjustable. One or more of these advantages may increase flexibility and capability to support a wide range of advanced features.

Techniques described herein may be dependent on sensor position settings and control configurations for specific applications. For low power consumption profiles, the second sensor 104 may be turned off, and a camera pipeline driven clock can be reduced.

Adjustable Sensor Locations

There may be three positions or locations of the sensors 102, 104, which may provide flexibility and enable advanced features.

The two sensors 102, 104 may be positioned very close to each other. Captured image and/or video quality may be greatly enhanced when the two sensors 102, 104 are targeting substantially the same view port, i.e., when theoretically the distance between the two sensors 102, 104 approaches zero. An adjustment algorithm may be used to shift the captured images to merge them into one.

Random image noise may be a problem, especially for a low light environment. Receive diversity with two sensors 102, 104 may be a good solution to reduce sensor noise without constraint of exposure time or overlapped image blurring due to time diversity. The two sensors 102, 104 may be placed close together to reduce a difference between captured scenes of the two sensors 102, 104. Sensor noise distribution may be independent and have the same variances. After combining two processed images from the two sensors 102, 104, the signal to noise ratio (SNR) may be calculated as follows:

$$SNR = 10\log\left(\frac{(S_1 + S_2)^2}{\text{var}(N_1) + \text{var}(N_2)}\right) \quad (1)$$
$$= 10\log\left(\frac{(2S_1)^2}{2\text{var}(N_1)}\right)$$
$$= 10\log\left(\frac{S_1^2}{\text{var}(N_1)}\right) + 3$$

where $S_1$ and $S_2$ are signals of the images captured from sensor 102 and sensor 104, and $\text{var}(N_1)$ and $\text{var}(N_2)$ are sensor noise image variances from sensor 102 and sensor 104, respectively. The SNR may be greatly improved by 3 decibels (dB) after combining the two sensors' image or video.

A mobile device with dual camera sensors is described herein. In the device, both setting and locations of the sensors may be adjustable. An intelligent feature-adaptive image combine engine may provide advanced features or applications, such as image quality improvement, 3-D image and video visualization, and 360-degree panoramic video generation.

Various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as limitations.

The various illustrative logical blocks, modules, and circuits described in connection with the aspects disclosed herein may be implemented or performed with a general purpose processor, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium. A storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Various modifications to the described aspects may be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

APPENDIX A

Pseudo code for mismatch offset calculation:

```
// find the 1-D Y mapping
For(i = 0; i<image height; i++)
{
    Y SumSensor1[i] = 0;
    Y SumSensor2[i] = 0;
    For(j = 0; j<image width; j++)
    {
        Y SumSensor1[i] += Sensor_1_Luma[i][j] ;
        Y SumSensor2[i] += Sensor_2_Luma[i][j] ;
    }
}
//find the max in the correlation of Y mapping
For(k= 0; k<maxSearchRange; k++)
{
    Correlation[k] = 0;
    Correlation[-k] = 0;
    For(i = 0; i<image height-k; i++)
    {
        Correlation[k] += Y SumSensor1[i] * Y SumSensor2[i+k];
        Correlation[-k] += Y SumSensor1[i+k] * Y SumSensor2[i];
    }
    Correlation[k] = Correlation[k]/( image height-k);
    Correlation[-k] = Correlation[k]/( image height-k);
    If(Correlation[k] > MaxCorrelation)
    {
        MaxCorrelation= Correlation[k];
        Yoffset = k;
    }
    If(Correlation[-k] > MaxCorrelation)
    {
        MaxCorrelation= Correlation[-k];
        Yoffset = -k;
    }
}
```

The invention claimed is:

1. An apparatus comprising:

a first image sensor configured to capture a first image comprising a plurality of pixels arranged in a plurality of rows and columns;

a second image sensor spaced apart from the first image sensor, the second image sensor configured to capture a second image comprising a plurality of pixels arranged in a plurality of rows and columns;

at least one controller configured to
   generate a one-dimensional mapping for the first sensor by summing a value of each pixel in each row or column of the first image and to generate a one-dimensional mapping for a second sensor by summing a value of each pixel in each row or column of the second image;
   determine a maximum one-dimensional cross correlation of a portion of the first image and a portion of the second image, the maximum one-dimensional cross correlation determined based on a correlation of data in a range of the one-dimensional mapping of the first sensor and the one-dimensional mapping of the second sensor, and
   determine a mismatch offset corresponding to the maximum one-dimensional cross correlation;
a diversity combine module to combine image data from the first and second image sensors; and
an image processing module configured to process combined image data from the diversity combine module.

2. The apparatus of claim 1, wherein the image processing module is configured to generate an anaglyph image for a stereoscopic display.

3. The apparatus of claim 1, wherein the image processing module is configured to generate an anaglyph image to be directly visualized on an autostereoscopic display.

4. The apparatus of claim 1, wherein the image processing module is configured to generate an anaglyph video for a stereoscopic display.

5. The apparatus of claim 1, wherein the image processing module is configured to generate an anaglyph video to be directly visualized on an autostereoscopic display.

6. The apparatus of claim 1, further comprising:
   a first buffer to store data from the first image sensor; and
   a second buffer to store data from the second image sensor, wherein the diversity combine module is configured to alternately receive data from the first and second buffers.

7. The apparatus of claim 1, wherein the at least one controller is configured to provide vertical direction one-dimensional mapping for data from the first and second image sensors.

8. The apparatus of claim 7, the at Least one controller further configured to:
   correlate vertical direction one-dimensional mapping data; and
   find a vertical mismatch offset corresponding to a maximum correlation of vertical mapping of image data from the first and second image sensors, wherein the diversity combine module uses the vertical mismatch offset to combine image data from the first and second image sensors.

9. The apparatus of claim 8, wherein the diversity combine module is configured to:
   compare the vertical mismatch offset to a vertical index of a first pixel from the first image sensor;
   if the vertical index of the first pixel from the first image sensor is greater than the vertical mismatch offset, then send the first pixel to the image processing module;
   compare the vertical mismatch offset to a vertical index of a second pixel from the second image sensor; and
   if the vertical index of the second pixel from the second image sensor is less than an image height minus the vertical mismatch offset, then send the second pixel to the image processing module.

10. The apparatus of claim 8, wherein the at least one controller is configured to compare the vertical mismatch offset to a threshold to determine if there was a stereo image composing failure.

11. The apparatus of claim 1, wherein the image processing module is configured to perform at least one of black subtraction, lens roll-off correction, channel gain adjustment, bad pixel correction, demosaicing, cropping, scaling, white balancing, color correction, luma adaptation, color conversion, and enhancing image contrast of the images captured by the first and second image sensors.

12. The apparatus of claim 1, wherein the image processing module comprises a color conversion module configured to perform a color channel mask task to compose 3-dimensional images.

13. The apparatus of claim 12, wherein the image processing module outputs red channel data for the first sensor row data and outputs green and blue channel data for the second sensor row data.

14. The apparatus of claim 1, wherein the first and second image sensors are positioned about six centimeters apart.

15. The apparatus of claim 1, wherein the second image sensor is configured to deactivate when the apparatus enters a low power mode.

16. The apparatus of claim 1, wherein the apparatus is a mobile phone.

17. The apparatus of claim 1, further comprising a transceiver configured to transmit and receive wireless signals.

18. The apparatus of claim 1, wherein a position of the first sensor is fixed and a position of the second sensor is fixed.

19. The apparatus of claim 1, wherein the apparatus is configured to adjust a position of at least one of the first sensor and the second sensor.

20. The apparatus of claim 1, wherein the controller is further configured to determine the one dimensional cross correlation by:
   summing first rows or columns of data acquired from the first image sensor;
   summing second rows or columns of data acquired from the second image sensor; and
   comparing averaged products of the first and second summed rows or columns.

21. A method comprising:
   sensing a first image using a first image sensor, the first image comprising a plurality of pixels arranged in a plurality of rows and columns;
   sensing a second image using a second image sensor spaced apart from the first image sensor, the second image comprising a plurality of pixels arranged in a plurality of rows and columns;
   generating a one-dimensional mapping for the first sensor by summing a value of each pixel in each row or column of the first image and generating a one-dimensional mapping for the second sensor by summing a value of each pixel in each row or column of the second image;
   determining a maximum one-dimensional cross correlation of a portion of the first image and a portion of the second image, the maximum one-dimensional cross correlation determined based on a correlation of data in a range of the one-dimensional mapping of the first sensor and the one-dimensional mapping of the second sensor;
   determining a one-dimensional mismatch offset based on the maximum one-dimansional cross correlation;
   diversity combining image data from the first and second image sensors; and
   processing the combined image data to generate an anaglyph image.

22. The method of claim 21, further comprising preparing the anaglyph image for a stereoscopic display.

23. The method of claim 21, further comprising preparing the anaglyph image to be directly visualized on an autostereoscopic display.

24. The method of claim 21, further comprising generating an anaglyph video for a stereoscopic display.

25. The method of claim 21, further comprising generating an anaglyph video to be directly visualized on an autostereoscopic display.

26. The method of claim 21 further comprising:
storing data from the first image sensor; and
storing data from the second image sensor, wherein diversity combining comprises alternately receiving data from the first and second buffers.

27. The method of claim 21, wherein processing the combined image comprises providing vertical direction one-dimensional mapping for data from the first and second image sensors.

28. The method of claim 27, further comprising:
correlating vertical direction one-dimensional mapping data; and
finding a vertical mismatch offset corresponding to a maximum one-dimensional correlation of vertical mapping of image data from the first and second image sensors, wherein diversity combining uses the vertical mismatch offset to combine image data from the first and second image sensors.

29. The method of claim 27, wherein diversity combining comprises:
comparing the vertical mismatch offset to a vertical index of a first pixel from the first image sensor;
if the vertical index of the first pixel from the first image sensor is greater than the vertical mismatch offset, then processing the first pixel;
comparing the vertical mismatch offset to a vertical index of a second pixel from the second image sensor; and
if the vertical index of the second pixel from the second image sensor is less than an image height minus the vertical mismatch offset, then processing the second pixel.

30. The method of claim 27, further comprising comparing the vertical mismatch offset to a threshold to determine if there was a stereo image composing failure.

31. The method of claim 21, wherein processing comprises performing at least one of black subtraction, lens roll-off correction, channel gain adjustment, bad pixel correction, demosaicing, cropping, scaling, white balancing, color correction, luma adaptation, color conversion, and enhancing image contrast of the images captured by the first and second image sensors.

32. The method of claim 21, wherein processing comprises performing a color channel mask task to compose 3-dimensional images.

33. The method of claim 32, wherein processing outputs red channel data for the first sensor row data and outputs green and blue channel data for the second sensor row data.

34. The method of claim 21, further comprising deactivating the second image sensor in a low power mode.

35. The method of claim 21, further comprising transmitting and receiving wireless signals.

36. The method of claim 21, wherein a position of the first sensor is fixed and a position of the second sensor is fixed.

37. The method of claim 21, further comprising adjusting a position of at least one of the first sensor and the second sensor.

38. The method of claim 21, wherein the one dimensional cross correlation is determined by
summing first rows or columns of data acquired from the first image sensor,
summing second rows or columns of data acquired from the second image sensor, and
comparing averaged products of the first and second summed rows or columns.

* * * * *